UNITED STATES PATENT OFFICE.

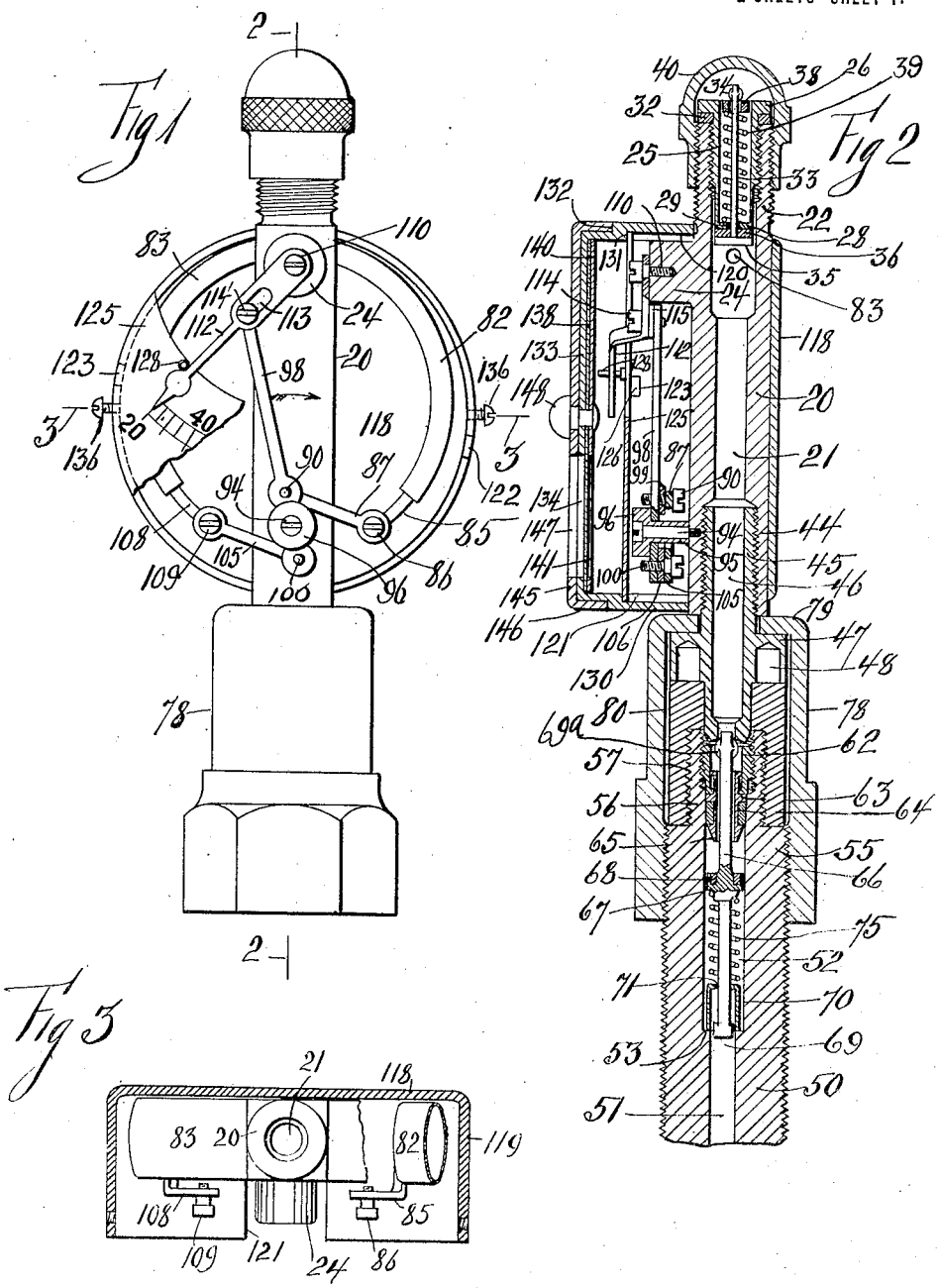

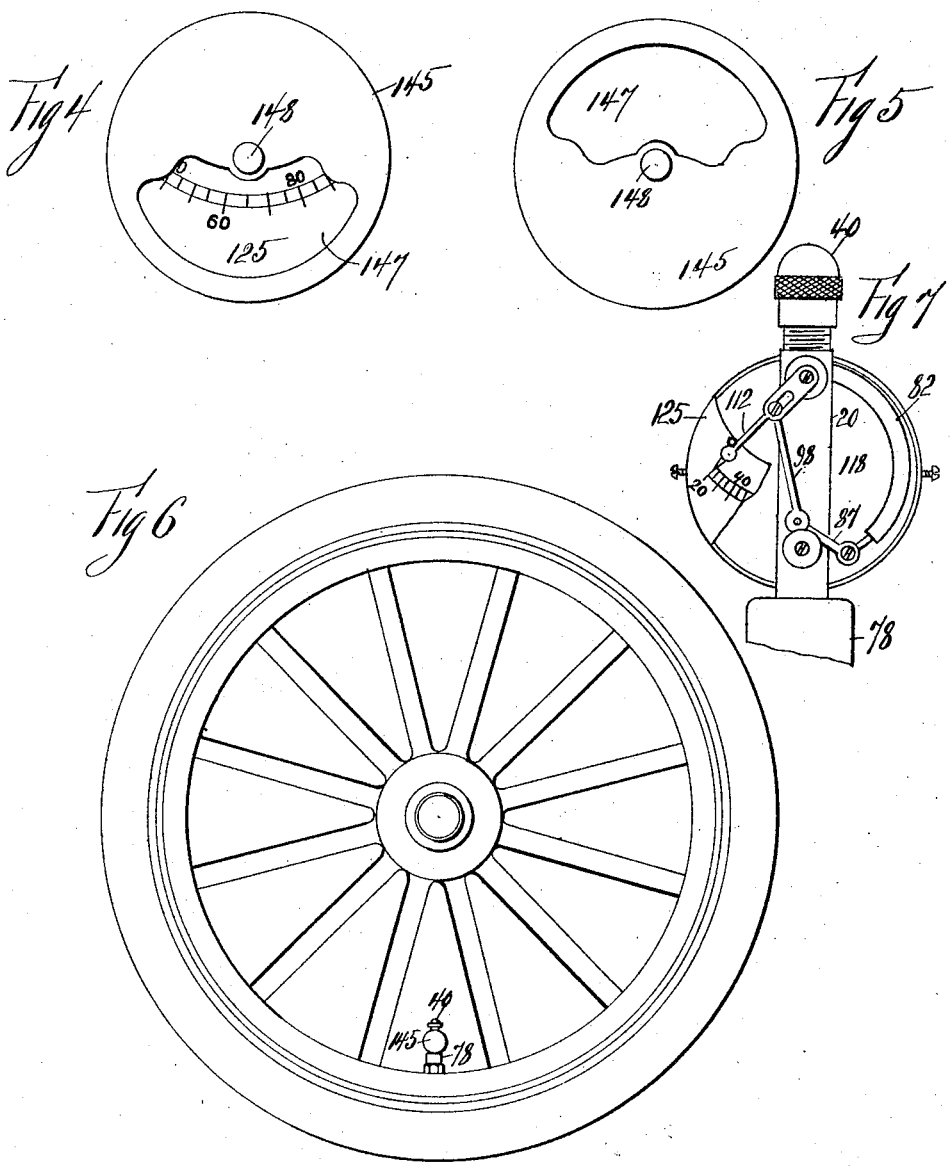

CARL E. A. ENGELMANN AND PAUL W. HUBBE, OF BROOKLYN, NEW YORK.

GAGE.

1,330,311.  Specification of Letters Patent.  Patented Feb. 10, 1920.

Application filed December 13, 1916. Serial No. 136,621.

*To all whom it may concern:*

Be it known that we, CARL E. A. ENGELMANN and PAUL W. HUBBE, both subjects of the Emperor of Germany, and both residents of the borough of Brooklyn, in the county of Kings and State of New York, have jointly invented certain new and useful Improvements in Gages, of which the following is a specification.

This invention relates to a gage that is particularly applicable to indicate the air pressure in the inner tube of an automobile tire, although it may be used for various other purposes. Its coacting mechanism permits the tire to be charged with air pressure without disengaging the gage from the tube. Its organization among other things is characterized by a central column with a conduit that has connected thereto one or a couple of flexible arms. A pointer arm coacts with the one or both of the said arms. The other points of novelty of the invention are described in the specification. The present disclosure shows one of the forms of the invention and the application is intended to cover all the forms thereof within the scope of the claim.

In the drawings Figure 1 represents a front elevation partly broken away of a gage exemplifying the invention; Fig. 2 shows a partial section of Fig. 1 on the line 2, 2 and an end view of some of the elements; Fig. 3 is a top plan view of some of the elements shown in Fig. 1 and a partial section of Fig. 1 on the line 3, 3; Fig. 4 represents a front view of a portion of Fig. 2 when not sectioned; Fig. 5 is a view similar to Fig. 4 with an element in a changed position; Fig. 6 shows a side elevation of an automobile wheel with the gage attached thereto, and Fig. 7 represents a view similar to Fig. 1 with a modification.

The gage is shown to comprise the central column 20 with the axial conduit or port 21. The upper end 22 of said column is provided with an external thread and an internal thread. A boss 24 extends from said column.

A bushing 25 is in threaded engagement with the internal thread of the end 22. The said bushing has formed at its top end the flange 26, and at its lower end the valve seat 28 and the port opening 29. Packing 32 is located between the flange and the top face of the end 22 of the column 20. A valve spindle 33, with the bulged portion 34, is located in the bushing 25 and extends through the port 29. A charging and check valve 35 with a disk of pliable material 36 is fastened to the spindle 33. A washer 38 is located at the upper end of the spindle 33 below the bulged portion 34. A spring 39 bears between the washer 38 and the seat 28. A cap 40 covers the upper end 22 of the column 20 and is in threaded engagement with the external thread of said end 22.

The lower end of the column 20 has formed therewith the internal thread 44 which engages the upper end of the bushing 45 having the axial conduit 46, and the flange 47 with the openings 48. The latter openings enable a wrench to tighten the said bushing 45 in place.

A threaded column is shown at 50 with the axial conduit or port 51 and enlarged conduit 52 which forms the shoulder 53.

The lower end of the column 50 is connected to the inner tube of an automobile tire not shown. The upper end of the column 50 is shouldered at 55 to form the reduced upper end 56 with the external thread 57. A threaded bushing 62 is located in the end 56 and supports the valve spindle guide 63. A valve seat 65 is formed at the lower end of the guide 63. A packing ring 64 is supported in an annular recess of the guide 63. A valve spindle 66 is guided in the guide 63, and which at about the central portion of its length has formed therewith an annular support 67 for the operating valve 68. At the lower end of the spindle 66 is formed the bulged portion 69 and at the top end is formed the bulged portion 69ª. A hood 70 with an axial opening 71 encircles the lower end of the spindle 66 and bears on the shoulder 53. A spring 75 bears between the support 67 and the hood 70.

A cap 78 has formed therewith the upper flange 79. The flange 79 bears on the flange 47 and the lower end of the cap is in threaded engagement with the column 50. Pliable packing 80 is located between the shoulder 55 and the flange 47.

From the central column 20 extend the flexible tubular arms 82, 83 which communicate with the conduit 21. An arm 85 extends from the tubular arm 82 and is perforated for a threaded pin 86. A link 87 has one end supported on the pin 86. A threaded pin 90 supports the other end of the link 87. A screw post 94 extends up from the column 20 and is surrounded by the sleeve 95 having the flange 96. An arm 98 has one end pivoted on the sleeve 95, and has in threaded engagement therewith the pin 90. A washer 99 on the pin 90 separates the arm 98 and the link 87. Diametrically opposite the pin 90 the arm 98 carries in threaded engagement the pin 100. The pin 100 supports the link 105, and a washer 106 separates the link 105 and the arm 98. An arm 108 extends from the tubular arm 83 and carries a threaded pin 109 which latter also supports one end of the link 105. A screw pin 110 is supported in the boss 24 and carries a pointer arm 112 having the elongated slot 113. A screw pin 114 extends through the slot 113 and engages one end of the arm 98. A washer 115 is located between the arms 98 and 112. The arms 85 and 108 are practically extensions of their tubular arms.

A casing 118 having the cylindrical wall 119 has formed in the latter the slots 120 and 121. Recesses 122, 123 are also formed in the wall 119. The said casing is maintained in place by locating the column 20 in the slots 120 and 121.

A moon shaped dial plate 125 has formed therewith clamping lugs 126 that engage the recesses 122 and 123. The dial plate has indicated thereon a scale as shown, and a stop pin 128 extends therefrom.

A cylindrical cover 130, having the shoulders 131, 132, top of plate 133 with the opening 134 is carried on the cylindrical wall 119 of the casing 118. The shoulder 131 bears against the dial plate 125. Screws 136 fasten the cover 130 to the casing 118. A disk 138 of transparent material like isinglass bears against the inner face of the plate 133. A disk 140 with an opening 141 bears against the inner face of the disk 138. A rotatable cover 145 with the cylindrical flange 146 is located upon the cover 130. The cover 145 has an opening 147, and the openings 134 and 141 are similar to the opening 147. A rivet 148 clamps together the covers 145, 130 and the disks 138 and 140.

To use the invention the column 50 is secured to the inner tube of the tire, and the cap 78 is turned on the thread of the said column 50 to compress the packing 80, to obtain air tight joints between said packing, the flange 47 and the shoulder 55. After the said air tight joints have been made and upon the further downward movement of the cap 78, the lower end of the threaded bushing 45 bears against the bulged top portion 69ª of the valve spindle 66 and thereby separates the valve 68 from its seat 65. Thereby the air pressure from the tube of the tire enters the conduit 21 and from thence enters the tubular arms 82, 83. The latter arms separate at their lower ends and thereby the arm 98 moves in the direction of the arrow, and the pointer arm 112 moves in the same direction. The air pressure in the tire is indicated on the scale of the plate 125 by the pointer arm 112.

When the tube of the tire is to be charged with air, the cap 40 is removed and the air line hose is attached to the top end 22 of the column 20 and the tire is charged in the usual manner.

In Fig. 4 the cover 145 is located with its opening 147 so that the scale on the dial plate 125 can be seen and in Fig. 5 said cover is turned so that the opening 134 of the plate 133 is covered, to protect the disk 138 of isinglass.

In Fig. 7 the invention is modified by eliminating the flexible tubular arm 83, the arm 108 and the link 105. In this figure is shown the central column 20, the arm 82, the caps 40 and 78, the arm 98, the link 87, the pointer arm 112, the dial plate 125 with its scale and the casing 118. In this modification the movements of the arm 98 are controlled by the arm 82 and the link 87.

Having described our invention, what we desire to secure by Letters Patent and claim, is:

In a gage the combination of a flexible tubular arm actuated by a fluid, a pointer arm, means operatively connecting said pointer arm with the free end of the tubular arm, a casing detachably connected to the gage, a cover having an opening detachably connected to the casing, a dial plate located between the cover and casing, a disk of transparent material bearing against the inner face of the cover and a rotatable cover with an opening connected to said cover.

Signed at the borough of Manhattan, in the county of New York and State of New York, this 9th day of December, A. D. 1916.

CARL E. A. ENGELMANN.
PAUL W. HUBBE.

Witnesses for both parties:
A. A. DE BONNEVILLE,
A. W. BAKER.